(12) United States Patent
Chan (10) Patent No.: US 7,488,123 B2
(45) Date of Patent: Feb. 10, 2009

(54) LATCHING MECHANISM FOR PLUGGABLE TRANSCEIVER MODULE

(75) Inventor: Seng-Kum Chan, Santa Clara, CA (US)

(73) Assignee: Emcore Corporation, Albuquerque, NM (US)

( * ) Notice: Subject to any disclaimer, the term of this patent is extended or adjusted under 35 U.S.C. 154(b) by 0 days.

(21) Appl. No.: 11/745,112

(22) Filed: May 7, 2007

(65) Prior Publication Data

US 2008/0279510 A1   Nov. 13, 2008

(51) Int. Cl.
  *G02B 6/36* (2006.01)
(52) U.S. Cl. .............................. 385/92; 385/53; 385/88
(58) Field of Classification Search ................... 385/53, 385/88, 92
  See application file for complete search history.

(56) References Cited

U.S. PATENT DOCUMENTS

| 6,786,653 | B1 * | 9/2004 | Hwang et al. ................. 385/92 |
| 2007/0140626 | A1 * | 6/2007 | Chan ........................... 385/89 |

* cited by examiner

*Primary Examiner*—Jennifer Doan (57) ABSTRACT

A pluggable module, such as an optical transceiver for coupling an information system unit to a fiber optical cable, and adapted for mating with a receptacle having a retention tab on the bottom surface thereof, including a housing having a top and a bottom surface; a rotatable lever disposed on an optical connector end of the housing; a pusher element coupled to the rotatable lever and adapted to move parallel to the bottom surface when the lever is actuated; and a spring loaded latch extending from the bottom of the housing for engaging a cavity in the receptacle so as to secure the module in the receptacle, the pusher element engaging the spring loaded latch such that when the moveable lever is rotated in a direction away from the housing, the latch is retraced to enable the module to be released from the receptacle.

12 Claims, 8 Drawing Sheets

FIG. 7C

LATCHING MECHANISM FOR PLUGGABLE TRANSCEIVER MODULE

REFERENCE TO RELATED APPLICATIONS

This application is related to co-pending U.S. patent application Ser. No. 11/305,883 filed Dec. 19, 2005, and assigned to the common assignee.

BACKGROUND OF THE INVENTION

1. Field of the Invention

The field of the invention relates to optical transceivers, and in particular to the actuator and latching mechanism for a pluggable assembly or module that provides a communications interface between a computer or communications unit having an electrical input/output connector or interface and an optical fiber, such as used in fiber optic communication links.

2. Description of the Related Art

A variety of optical transceivers are known in the art which include an optical transmit portion that converts an electrical signal into a modulated light beam that is coupled to an optical fiber, and a receive portion that receives an optical signal from an optical fiber and converts it into an electrical signal. Traditionally, an optical receive portion includes an optical assembly to focus or direct the light from the optical fiber onto a photodector, which, in turn, is connected to an amplifier/limiter circuit on a circuit board. The optical transmit portion contains a photodiode and similar optical provisions and, in turn, is coupled to a driver board.

The photodetector or photodiode is typically packaged in a hermetically-sealed package in order to protect it from harsh environmental conditions. The photodetectors or photodiodes are semiconductor chips that are typically a few hundred microns to a couple of millimeters wide and 100-500 microns thick. The package in which a photodetector or photodiode is mounted is typically 3 to 6 mm in diameter and 2 to 5 mm tall, and has several electrical leads coming out of the package which are, in turn, soldered to the circuit board containing the amplifier/limiter or driver.

Optical transceivers are packaged in a number of standard form factors. Standard form factors provide standardized dimensions and input/output interfaces that allow devices from different manufacturers to be used interchangeably.

Although latching mechanisms for large conventional pluggable modules have been used successfully in the past, they tend to be unsuitable for miniaturization which is an ever-constant objective in the industry. It is desirable to miniaturize transceivers in order to increase the port density associated with the network connection, such as, for example, switch boxes, cabling patch panels, wiring closets, and computer I/O. The SFP MSA standard (i.e., "small form factor pluggable") has been promulgated, and this standard specifies a predetermined enclosure height and width and electrical input/output connections, and a certain latch design. However, the MSA does not specify any actuating mechanism, which is left to each vendor to implement.

In addition to miniaturizing the module, it is also desirable to increase its operating frequency. For example, applications are quickly moving from the sub-gigabit realm to well over a gigabit. Conventional pluggable module configurations, however, cannot meet these parameters.

Miniaturizing a module, providing a suitable latch actuating mechanism and providing high operating speed, presents a number of design problems, particularly in applications in which data transmission rates are high, e.g., in the range of 1-10 Gbs (Gigabits/second). Of particular concern is providing an appropriate latching actuator while reducing electromagnetic inference (EMI) emissions.

SUMMARY OF THE INVENTION

1. Objects of the Invention

It is an object of the present invention to provide an improved optical transceiver using a latching mechanism.

It is also an object of the present invention to provide an optical transceiver for use in an optical transmission system with an industry standard small form factor pluggable (SFP) or SFP+housing.

2. Features of the Invention

Briefly, and in general terms, the present invention provides a pluggable module, such as an optical transceiver for coupling an information system unit to a fiber optical cable, and adapted for mating with a receptacle having a retention tab on the bottom surface thereof, including: a housing having a top and a bottom surface; a rotatable lever disposed on an optical connector end of the housing; a pusher element coupled to the rotatable lever and adapted to move parallel to the bottom surface when the lever is actuated; and a spring loaded latch extending from the bottom of the housing for engaging a cavity in the receptacle so as to secure the module in the receptacle, the pusher element engaging the spring loaded latch such that when the movable lever is rotated in a direction away from the housing, the latch is retracted to enable the module to be released from the receptacle.

Additional objects, advantages and novel features of the present invention will become apparent to those skilled in the art from this disclosure, including the following detailed description as well as by practice of the invention. While the invention is described below with reference to preferred embodiments, it should be understood that the invention is not limited thereto. Those of ordinary skill in the art having access to the teachings herein will recognize additional applications, modifications and embodiments in other fields, which are within the scope of the invention as disclosed and claimed herein and with respect to which the invention could be of significant utility.

BRIEF DESCRIPTION OF THE DRAWINGS

These and other features and advantages of this invention will be better understood and more fully appreciated by reference to the following detailed description when considered in conjunction with the accompanying drawings, in which.

The novel features and characteristics of the invention are set forth in the appended claims. The invention itself, however, as well as other features and advantages thereof, will be best understood by reference to a detailed description of a specific embodiment, when read in conjunction with the accompanying drawings.

DETAILED DESCRIPTION OF THE PREFERRED EMBODIMENT

Details of the present invention will now be described, including exemplary aspects and embodiments thereof. Referring to the drawings and the following description, line reference numbers are used to identify like or functionally similar elements, and are intended to illustrate major features of exemplary embodiments in a highly simplified diagrammatic manner. Moreover, the drawings are not intended to depict every feature of actual embodiments nor the relative dimensions of the depicted elements, and are not drawing to scale.

Figure 1:
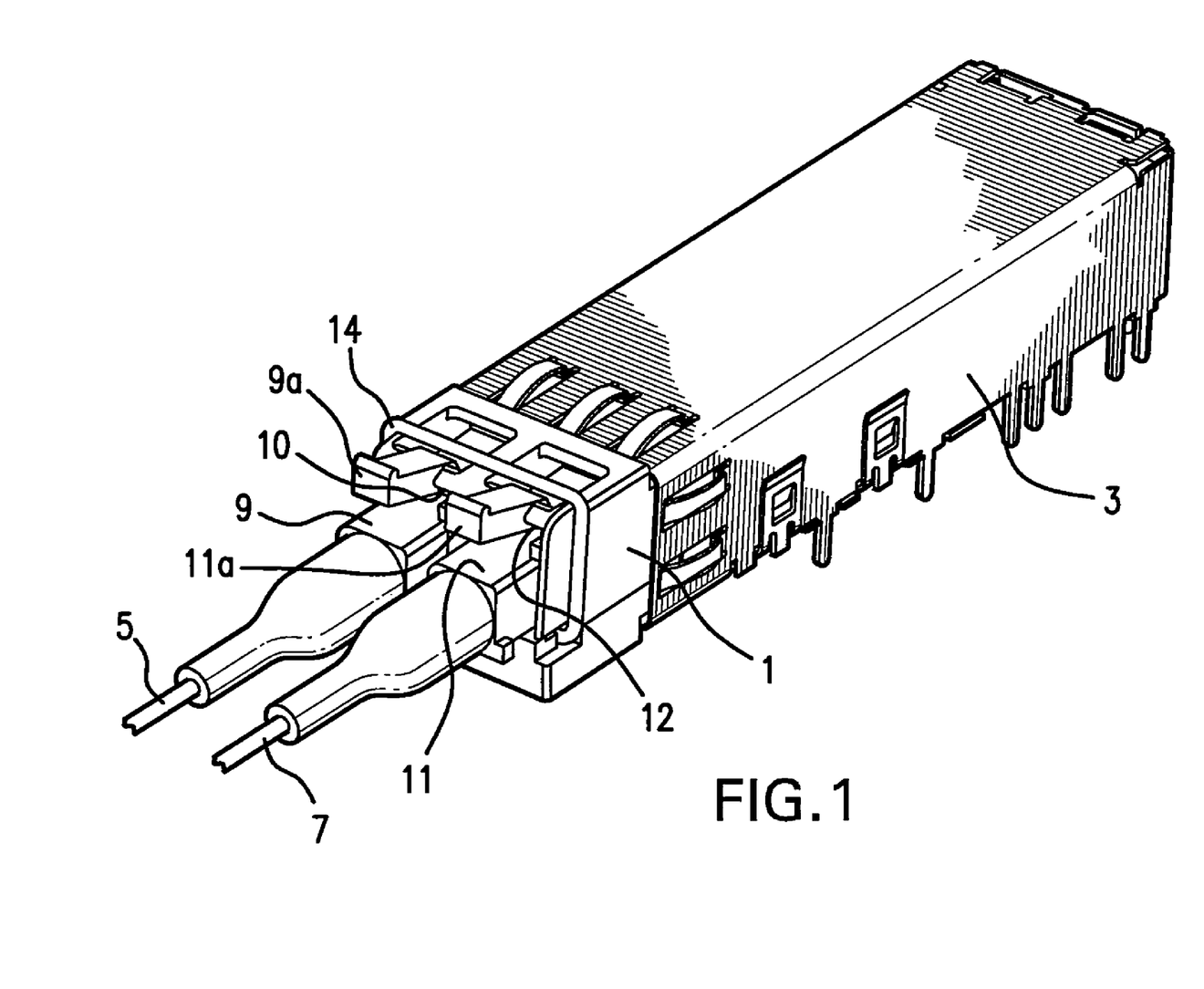
FIG. 1 is a top, side, perspective view of a pluggable module and a cage for use in an information system in accordance with an illustrated embodiment of the invention.

Referring to the drawings, FIG. 1 shows a pluggable optical transceiver module 1 housed within an electromagnetic interference (EMI) cage 3. Fiber optic cables 5, 7 are removably connected to the pluggable optical transceiver module 1 by means of fiber optic connectors 9, 11. Each fiber optic connector 9, 11 is provided with a retaining latch 9a, 11a to retain the fiber optic connectors within receiving connector cavities 10, 12, in the module 1. Depressing the retaining latches 9a, 11a releases them from associated retainers (not shown), and allows the easy release and removal of the fiber optic connectors 9, 11 from the receiving cavities 10, 12.

A small form factor pluggable component (SFP) 13 is attached to a lower side of the pluggable optical transceiver module 1. A rotatable bail 14 is pivotally connected to, and extends from, a lower side of the SFP 13, and this is described in greater detail below.

Figure 2A:
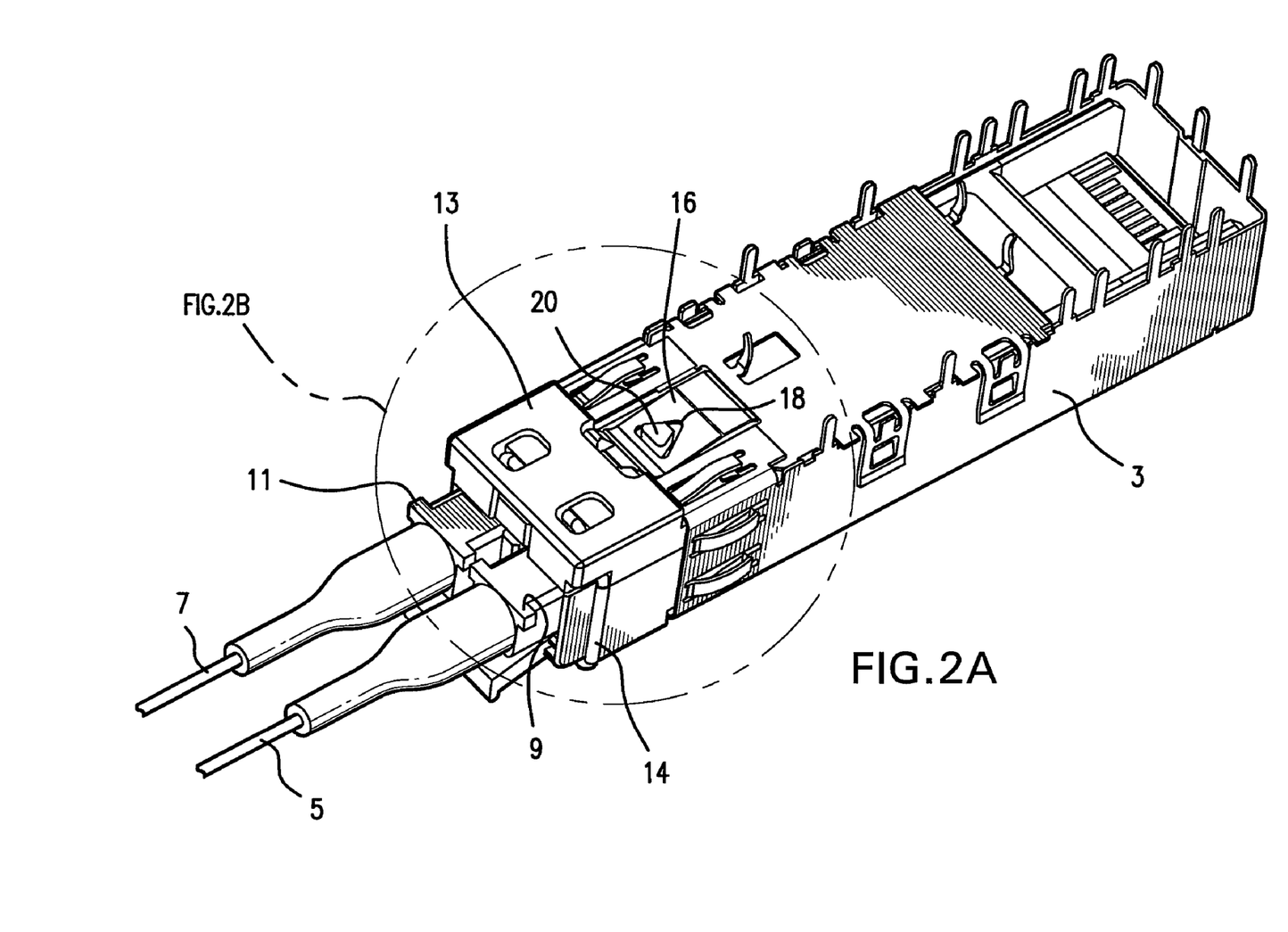
FIG. 2A is a bottom, side, perspective view of the pluggable module and cage of FIG. 1.
Figure 2B:
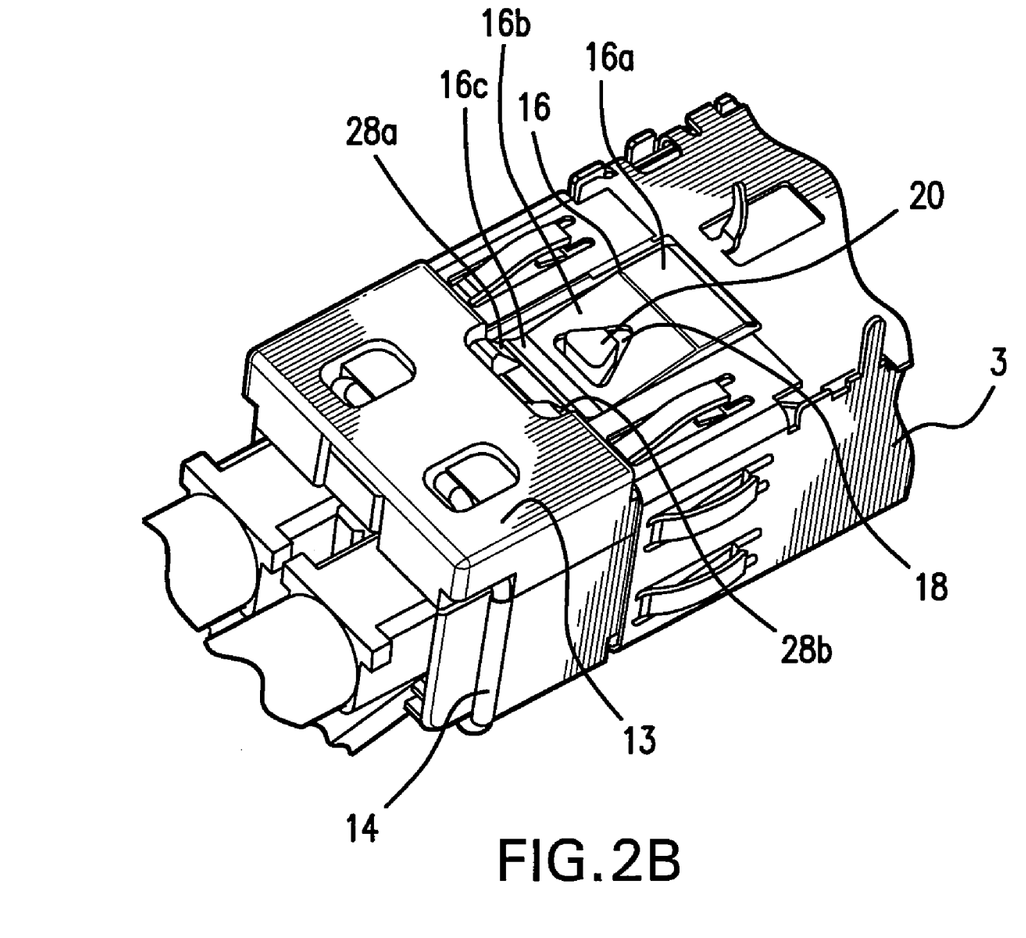
FIG. 2B is an enlarged bottom perspective view of a front end of the pluggable module and cage of FIG. 2A.

In FIG. 2A, an underside of the module 1 housed within the EMI cage 3 is shown. FIG. 2B shows one end of the module 1 and EMI cage 3 in an enlarged scale. A spring-loaded retention tab 16 extends from an open end of the EMI cage 3, the retention tab having an upper region 16a, a centre region 16b, and a lip region 16c formed therein. This can be seen more clearly in FIG. 3. The retention tab 16 is formed such that it extends slightly inwards from the plane of a surface of the EMI cage 3 from which the retention tab extends. A triangular shaped hole 18 is formed in the centre region 16b retention tab 16.

Figure 3:
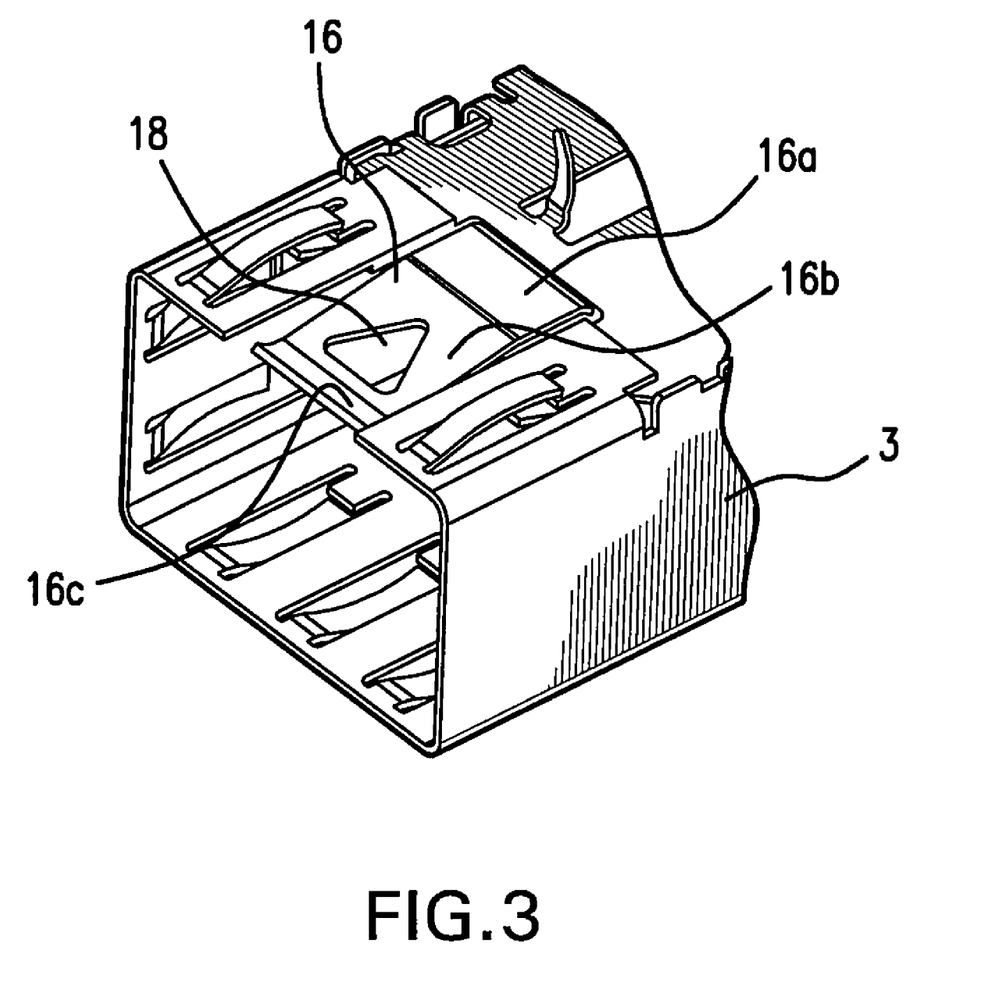
FIG. 3 is an enlarged bottom perspective view of a front end of the cage showing the retention tab.

A substantially prismatic-shaped protrusion 20 extends from the underside of the SFP 13. When the module 1 is inserted into the cage 3, the protrusion 20 engages with the lip region 16c of the retention tab 16, causing the retention tab to be lifted upwards and slide over the protrusion, until, when the module is fully inserted, the protrusion is aligned with the complementary-shaped triangular hole 18, allowing the spring loaded retention tab to be urged back to its original position, and with the protrusion extending at least partially through the hole. In this position, the module 1 is effectively locked into the cage 3, the retention tab 16 and protrusion 20 preventing the module from sliding out of the cage.

Figure 4:
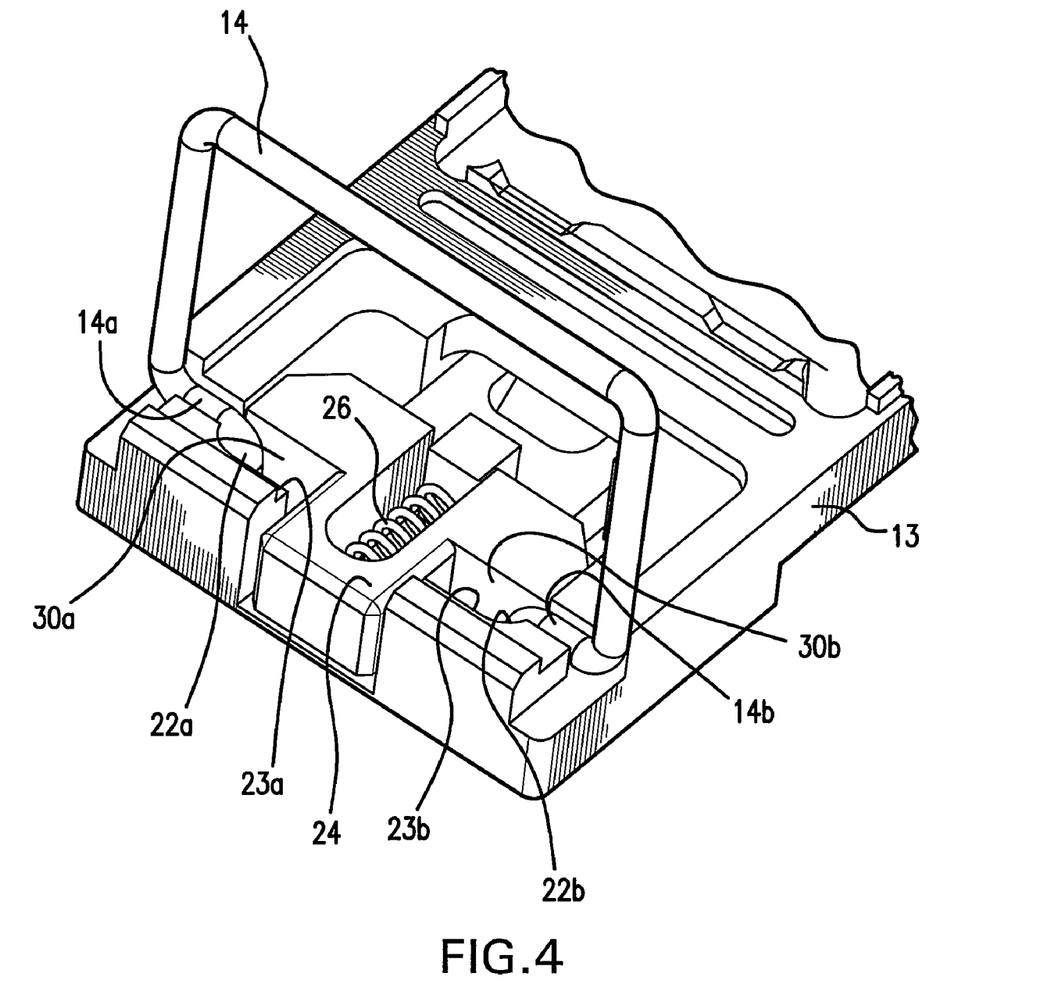
FIG. 4 is a top cut-away view of a front portion of the pluggable module of FIG. 1 with a rotatable bail in a closed position.

In FIG. 4, one end of the SFP 13 is shown. A bail 14 is rotatably mounted to the SFP 13, at pivot points 14a, 14b. Offset sections 22a, 22b of the bail 14 extend outwards from the general loop shape of the bail 14, into cavities 23a, 23b in the SFP 13.

A pusher element 24 is mounted on the SFP 13, and is movable in a direction parallel to the surface of the SFP. A coil spring 26, positioned between a section of the SFP 13 and the pusher element 24, causes the pusher element to engage the offset regions 22a, 22b of the bail 14.

Figure 5:
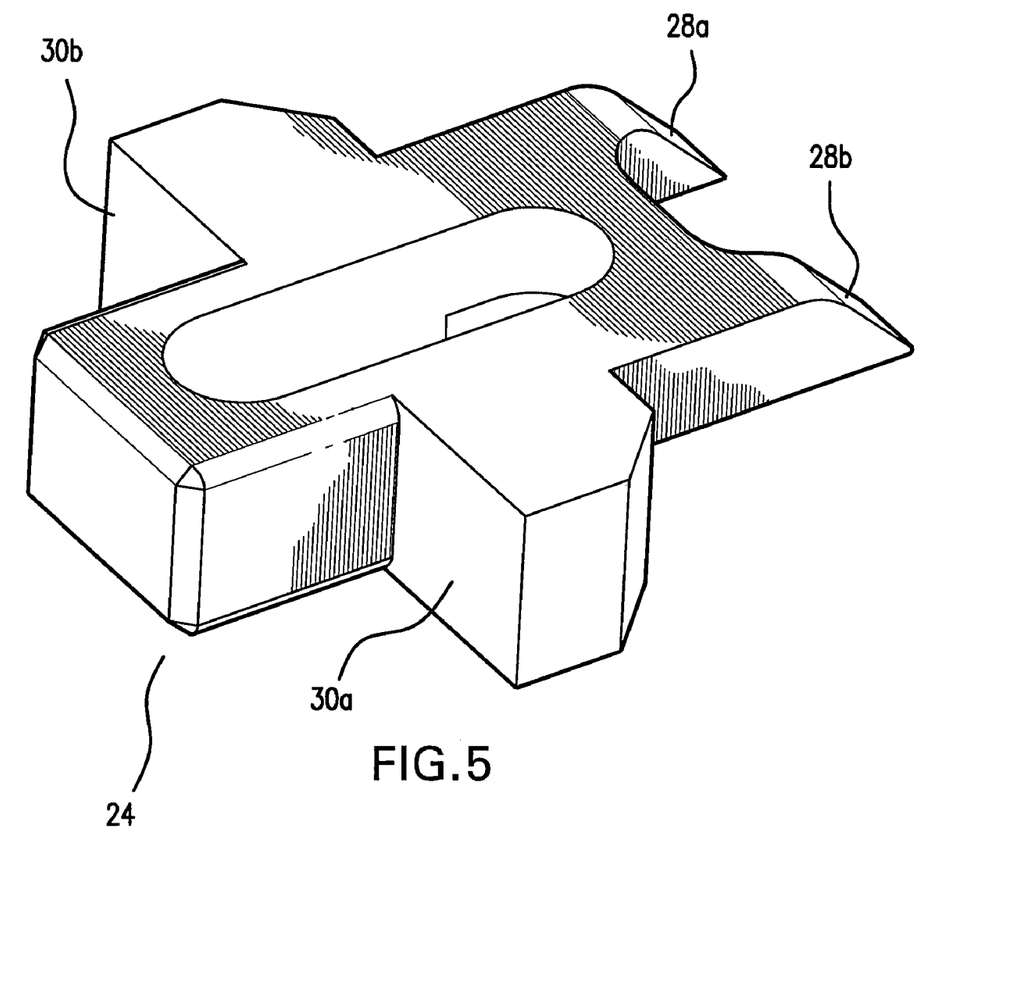
FIG. 5 is a perspective view of a pusher element of the pluggable module of FIG. 1.

In FIG. 5, the pusher element 24 is shown on its own in greater detail. At one end of the pusher element 24, a pair of ramps 28a, 28b are formed. When positioned in the module 1, the ramps 28a, 28b are adjacent to the lip region 16c of the retention tab 16 of the cage 3, as shown in FIG. 2B.

Figure 6:
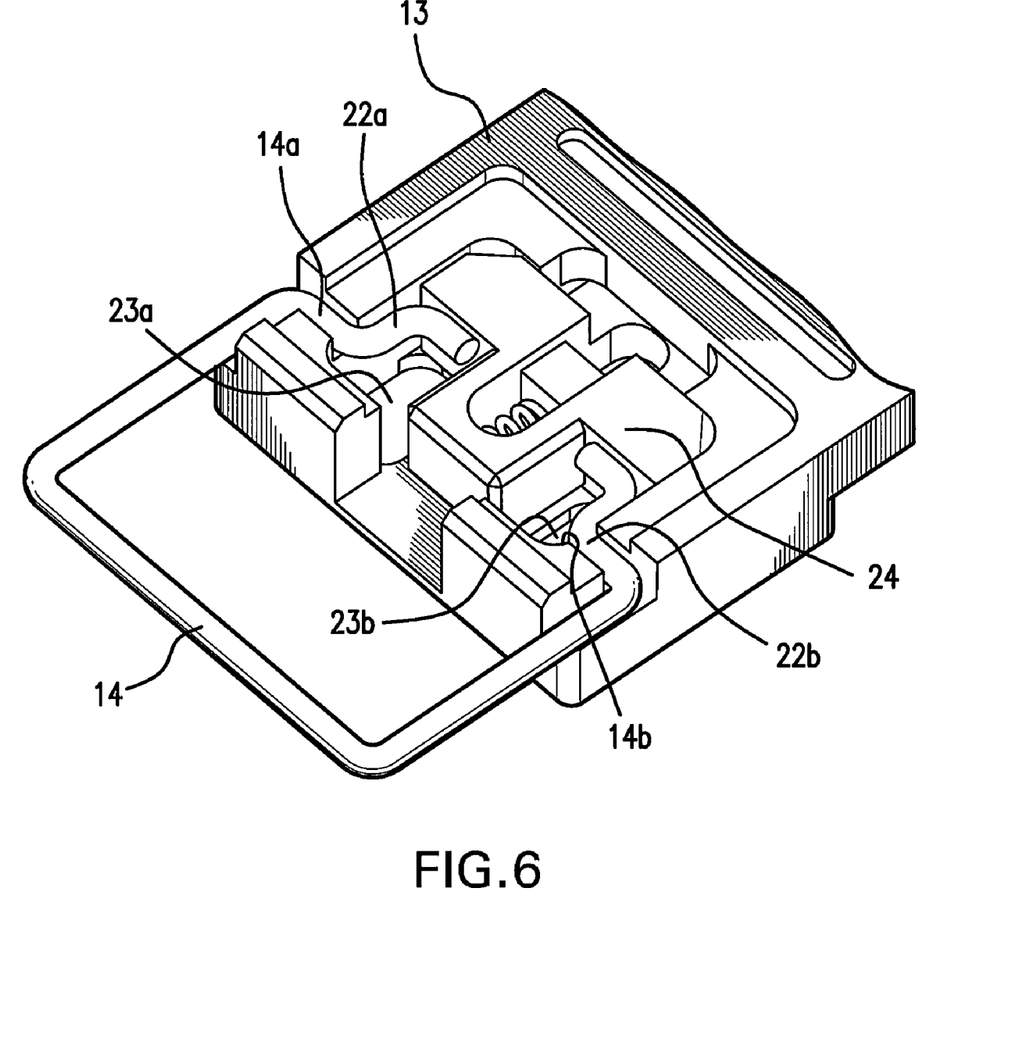
FIG. 6 is a top cut-away view of a front portion of the pluggable module and cage of FIG. 1, with the rotatable bail in an open position.
Figure 7A:
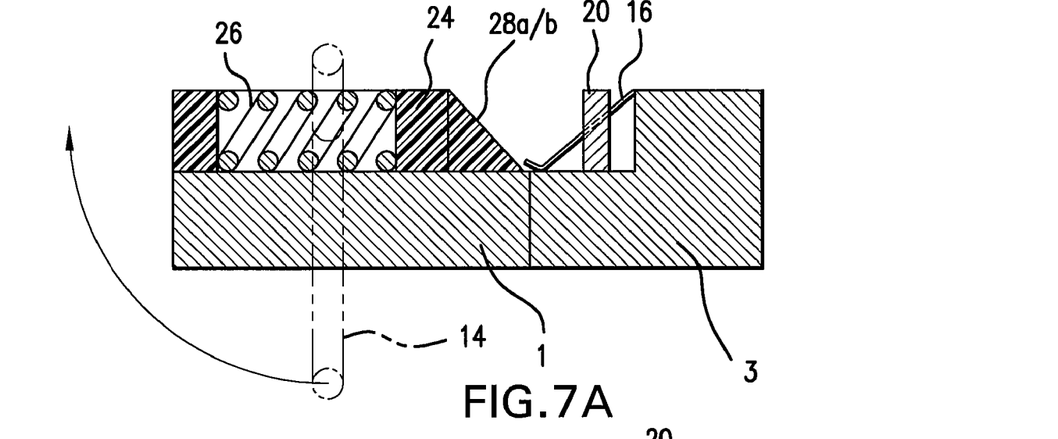
FIG. 7A is a cross-sectional view of the pluggable module and cage of FIG. 1 with the rotatable bail in a closed position.
Figure 7B:
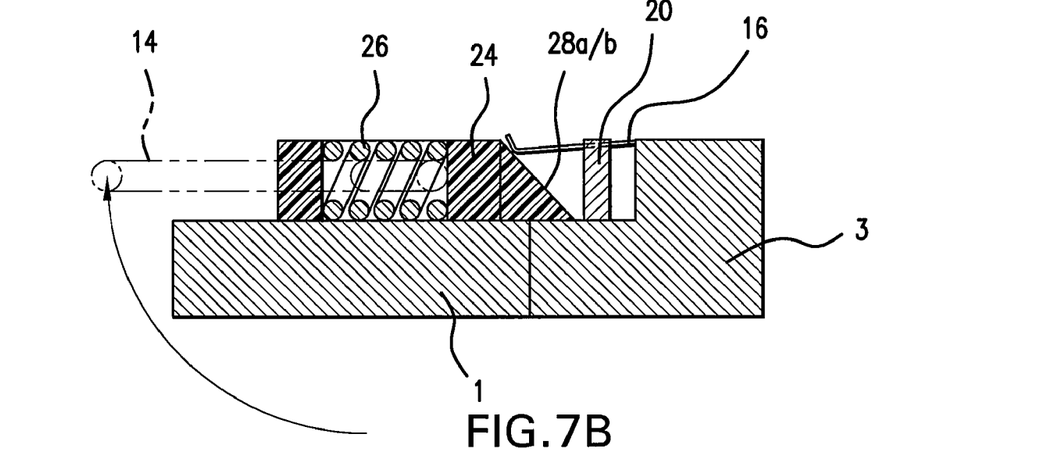
FIG. 7B is a cross-sectional view of the pluggable module and cage of FIG. 1, with the rotatable bail in an open position.
Figure 7C:
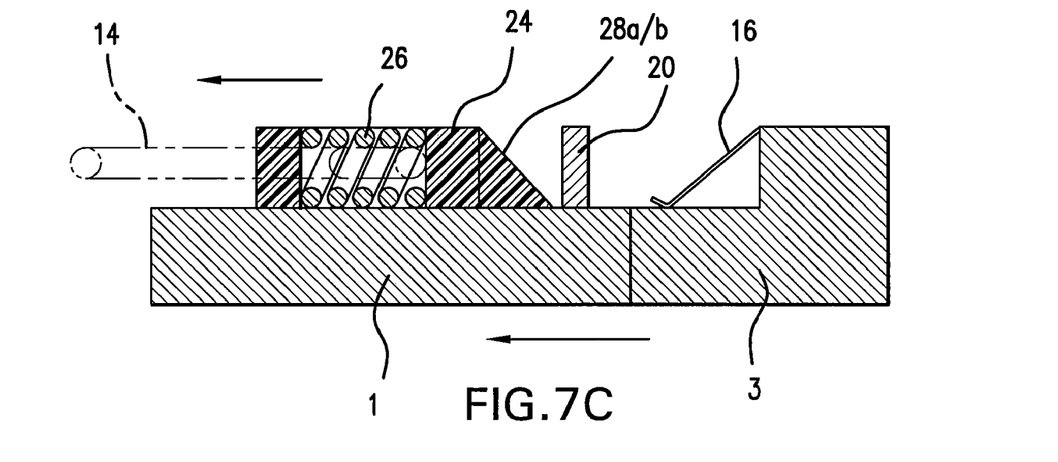
FIG. 7C is a cross-sectional view of the pluggable module partially removed from the cage.

When it is desirable to remove the module 1 from the cage 3, a user rotates the bail 14 away from the module, from a first position where the bail is in an approximately vertical position, through an angle of approximately 90°, to a second position where the bail is in an approximately horizontal position. Rotation about the pivot points 14a, 14b causes the offset regions 22a, 22b to engage corresponding surfaces 30a, 30b of the pusher element 24. The rotation of the offset regions 22a, 22b of the bail 14 causes the pusher element 24 to be urged towards the cage 3, against the resistance of the coil spring 26. Consequently, as the bail is rotated, the ramps 28a, 28b of the pusher element 24 engage the lip region 16c of the retention tab 16 of the cage 3, urging the retention tab upwards. The retention tab 16 is raised sufficiently high so that the protrusion 20 no longer extends through the hole 18 of the retention tab. FIG. 6 shows in greater detail the situation when the bail 14 has been rotated through an angle of approximately 90°, and is in an open position. In this position, a user is able to use the bail 14 to pull the module 1 out of the cage 3. The process of rotating the bail 14 and removing the module 1 from the cage 3 is shown schematically in the cross-sectional views of FIGS. 7A, 7B and 7C.

When the bail is in its horizontal position, the offset sections 22a, 22b engage a stopper surface (not shown) of the pusher element 24, preventing further rotation of the bail.

When the module 1 has been removed from the cage 3, the user releases the bail 14. The coil spring 26 then urges the pusher element 24 back to its first position. Consequently, the engaging surfaces 30a, 30b of the pusher element 24 urge the rotation of the bail 14, returning it to its original closed position. Upon returning to the closed position, with the bail in an approximately vertical position, the offset regions 22a, 22b of the bail 14 engage the pusher element 24, preventing further rotation of the bail.

It will be appreciated that various alternatives to the module described hereinbefore can be made, including:
- the protrusion 20 and corresponding hole 18 may be of any other shape, for example, a cuboid protrusion and rectangular hole, or a hexagonal prism protrusion and hexagonal hole;
- the retention tab 16 may be replaced by a plurality of retention tabs;
- the coil spring 26 may be replaced by some other resilient member;
- the two ramps 28a, 28b of the pusher element 24 may be replaced by the single ramp or any number of ramps.

It will be understood that each of the elements described above, or two or more together, also may find a useful application in other types of constructions differing from the types described above.

While the invention has been illustrated and described as embodied in an optical transceiver, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention and, therefore, such adaptations should, and are intended to be comprehended within the meaning and range of equivalence of the following claims.

I claim:

1. A pluggable module, such as an optical transceiver for coupling an information system unit to a fiber optical cable, and adapted for mating with a receptacle having a retention tab on a lower surface thereof, the module comprising:
    a housing having first and second opposed surfaces;
    a rotatable lever disposed on an optical connector end of the housing with a first portion external of the housing for grasping and removal of the module from the receptacle by a user;
    a pusher element coupled to said rotatable lever and adapted to move parallel to said bottom surface when the lever is actuated; and
    a protrusion extending from the second surface of said housing for engaging a cavity in the rotation tab so as to secure the module in the receptacle, said pusher element engaging the retention tab such that, when the moveable lever is rotated in a direction away from the housing, the retention tab is retracted to enable the module to be released from the receptacle.

2. A module according to claim 1, wherein the rotatable lever is provided with an offset region, and wherein actuation of the lever causes the offset region to interact with the pusher element.

3. A module according to claim 2, wherein, when the rotatable lever if fully actuated, the offset region engages a stopper, preventing further rotation of the lever.

4. A module according to claim 1, further comprising a resilient member for urging the rotatable lever to return to a non-actuated position.

5. A module according to claim 4, wherein the resilient member is a coil spring.

6. A module according to claim 1, wherein the pusher element comprising at least one chamfered region, said at least one chamfered region forming at least one ramp.

7. A module according to claim 6, wherein said at least one chamfered region is positioned such that it engages the retention tab when the rotatable lever is actuated.

8. A module according to claim 1, wherein the cavity is substantially triangular in shape.

9. A module according to claim 8, wherein the protrusion is substantially triangular prismatic in shape.

10. A module according to claim 9, wherein the substantially triangular prism-shaped protrusion fits at least partially through the cavity in the receptacle.

11. A module according to claim 1, wherein said first surface of said housing is a top surface.

12. A module according to claim 1, wherein the second surface of said housing is a bottom surface.

* * * * *